United States Patent [19]

Grandhee

[11] Patent Number: 5,786,420

[45] Date of Patent: *Jul. 28, 1998

[54] METHOD FOR PREPARING HYDROPHOBICALLY MODIFIED EMULSION POLYMERS, POLYMERS OBTAINED THEREBY, AND WATERBORNE COATING COMPOSITIONS CONTAINING THE POLYMERS

[75] Inventor: Sunitha Grandhee, Novi, Mich.

[73] Assignee: BASF Corporation, Southfield, Mich.

[*] Notice: The term of this patent shall not extend beyond the expiration date of Pat. No. 5,569,715.

[21] Appl. No.: 690,669

[22] Filed: Jul. 26, 1996

Related U.S. Application Data

[63] Continuation-in-part of Ser. No. 506,142, Jul. 24, 1995, abandoned, and Ser. No. 506,143, Jul. 24, 1995, Pat. No. 5,569,715.

[51] Int. Cl.$^6$ ............................................. C08F 283/00
[52] U.S. Cl. ........................... 525/7; 525/301; 525/303; 525/305; 525/455
[58] Field of Search ..................... 525/7, 301, 303, 525/305, 455

[56] References Cited

U.S. PATENT DOCUMENTS 5,569,715  10/1996  Grandhee ......................... 525/7

Primary Examiner—Edward J. Cain
Attorney, Agent, or Firm—Anne Gerry Sabourin

[57] ABSTRACT

The present invention is a process for hydrophobically modified emulsion polymers, polymers obtained thereby, waterborne coating compositions containing the polymers and a coated substrate coated with the coating composition. The emulsion polymer is formed by first combining hydrophobic polymeric compound and $\alpha,\beta$-ethylenically unsaturated monomer, and surfactant to form a mixture and subjecting the mixture to high stress techniques to form stabilized particles of the hydrophobic polymer and monomers, in the aqueous phase, said particles having a particle size between 50 and 500 nm. The polymerizable material within the particles is polymerized to form a hydrophobically modified core polymer. Additional monomers including at least one $\alpha,\beta$-ethylenically unsaturated hydrophilic monomer are then added to the core polymer and polymerized by emulsion polymerization, to form a hydrophobically modified core-shell emulsion polymer. To form a coating composition, the emulsion polymer is combined with additional components such as pigments, crosslinkers, plasticizers and solvents. The coating is applied to a substrate to form a coated article.

34 Claims, No Drawings

METHOD FOR PREPARING HYDROPHOBICALLY MODIFIED EMULSION POLYMERS, POLYMERS OBTAINED THEREBY, AND WATERBORNE COATING COMPOSITIONS CONTAINING THE POLYMERS

This application is a continuation-in-part of U.S. patent application Ser. No. 08/506,142, now abandoned, and U.S. patent application Ser. No. 08/506,143, now U.S. Pat. No. 5,569,715, filed concurrently on Jul. 24, 1995.

BACKGROUND OF THE INVENTION

1. Field of the Invention

The present invention relates to a method for preparing hydrophobic emulsion polymers, hydrophobic emulsion polymers prepared thereby, and waterborne coating compositions containing these polymers.

2. Background of the Invention

Emulsion polymers are desirable for use in coating compositions as these provide waterborne coatings with lower volatile organic content than solvent borne coatings. Such emulsions, when used in a coating, provide excellent appearance and desirable rheological characteristics.

Acrylic emulsion polymers may be formed by either one step batch, or by two-step emulsion polymerization processes. The batch one step process refers to combining all reactants and polymerizing in a single step. A two-step emulsion polymerization refers to forming a first polymer and then adding and polymerizing additional reactants in the presence of the first polymer to form the final emulsion polymer. The two-step emulsion polymerization process may be used to form a core-shell polymer.

The core-shell polymer refers to the morphology of the final polymer particles. The core refers to the polymer formed in the first step. The shell refers to the polymer formed by polymerizing additional monomers in the presence of the polymer formed in the first step. The monomers for the core may be varied from those of the shell to provide a core having varied characteristics from the shell. Such variations include differing hardnesses by using monomers with different glass transition temperatures, as taught by Morgan et al. in Journal of Applied Polymer Science, Vol. 27, p.2033–2042 (1982). Other variations include varying polarity or molecular weights of the core and shell.

Emulsion polymers are desirable for use in coating compositions as these provide waterborne coatings with lower volatile organic content than solvent borne coatings. Such emulsions, when used in a coating composition, provide excellent appearance and desirable rheological characteristics.

Core-shell acrylic emulsion polymers containing a hydrophobic component are highly useful when used in a coating composition. In addition to the benefits listed above for emulsion polymers, the core-shell emulsion polymers contribute to improved solvent tolerance of the coating composition. Hydrophobic core-shell polymers also can be used to provide high solids waterborne coatings. The hydrophobicity is generally introduced via acrylic monomers having at least four carbon atoms in the side chain. However, the level of hydrophobicity which can be introduced by such methods is limited.

It is desirable, therefore, to provide a coating composition comprising core-shell emulsion polymers having a high concentration of hydrophobe, and whereby a variety of hydrophobes can be introduced.

SUMMARY OF THE INVENTION

The present invention is directed to a process for hydrophobically modified core-shell emulsion polymers, the polymers obtained thereby, and waterborne coating compositions comprising these emulsion polymers. The invention further defines a method for application of the coatings and a coated substrate having the coating thereon.

The process of obtaining a hydrophobically modified core-shell emulsion polymer includes first forming a mixture of a hydrophobic polymeric compound and $\alpha$, $\beta$-ethylenically unsaturated monomers, surfactant and water and subjecting the mixture to high stress techniques to form droplets or particles of the mixture. The $\alpha$, $\beta$-ethylenically unsaturated groups within the particles are then co-polymerized by a process of "mini-emulsion" polymerization, to form the core polymer.

Mini-emulsion refers to polymerization occurring in small droplets of the mixture, in contrast to polymerization of the micelles (aggregates of large molecules), as occurs in classical emulsion polymerization. The monomers are fed gradually into the micelles and polymerized in the micelles. In the present invention, surfactant, water, hydrophobe and monomers are combined and subjected to high stress techniques to form small droplets of the mixture having a particle size of between 50 and 500 nm. These droplets are polymerized. This technique is referred to in the application as mini-emulsion polymerization.

One or more $\alpha$, $\beta$-ethylenically unsaturated monomers, including hydrophilic $\alpha$, $\beta$-ethylenically unsaturated monomers are then added to the first emulsion polymer and co-polymerized by classical emulsion polymerization, to form the shell polymer.

The present invention is advantageous in that it provides a coating comprising hydrophobic core—hydrophilic shell emulsion polymer formed by introducing a "foreign hydrophobe", in the form of a hydrophobic polymer, into the core, to achieve a level of hydrophobicity in the core not attainable by merely varying the $\alpha$, $\beta$-ethylenically unsaturated monomers in the core. By "foreign hydrophobe" is meant that the hydrophobe is a hydrophobic polymer, separate from the monomers used to polymerize the core and shell. However, the hydrophobe becomes part of the final core-shell polymer particles and does not merely exist as separate hydrophobe particles in the emulsion polymer.

A coating composition is formed by combining the emulsion polymer with various additives including, but not limited to, pigments, crosslinkers, plasticizers, and mixtures thereof. The coating composition may be used to coat any polymeric or metal substrate. Due to its excellent rheological properties, the coating composition is highly useful as a clearcoat or a pigmented basecoat for coating a polymeric or metallic substrate. The coating is particularly suitable for coating automotive substrates.

DETAILED DESCRIPTION OF THE INVENTION

Coating compositions of the present invention include hydrophobically modified emulsion polymers having a hydrophobic core and a hydrophillic shell. The expressions "core" and "shell" are used herein, based on the premise that in the first polymerization step a hydrophobically modified acrylic core polymer is obtained and in the second polymerization step a hydrophilic shell is formed on the outside of the core.

The core-shell emulsion polymers used in the coating composition of the present invention are made by a two-step emulsion polymerization process. The core is formed in the first step by mixing a hydrophobic polymeric compound and α,β-ethylenically unsaturated monomers, combining the mixture with surfactant and water, and subjecting the mixture to high stress techniques to form surfactant stabilized particles or droplets of the hydrophobic polymer and monomers in the aqueous phase. The particles have a diameter of between 50 and 500 nm and, preferably, having an average particle size of between 100–300 nm. The α,β-ethylenically unsaturated groups within the particles or droplets are then co-polymerized by either a batch redox or thermal semi-continuous emulsion polymerization process.

A hydrophilic outer shell polymer is formed in a second step, by adding to the polymer formed in the first step, a mixture of α,β-ethylenically unsaturated monomers containing one or more hydrophilic monomers and surfactant, and then co-polymerizing the mixture by batch redox or thermal semi-continuous emulsion polymerization.

For purposes of the present invention, a hydrophobic polymeric compound is defined as a polymeric compound that, when mixed with an organic component and water, is mostly present in the organic phase, while a separate aqueous phase is observed. The hydrophobic polymer used in the core may comprise greater than 60% of the core polymer composition, preferably, the hydrophobic polymer comprises up to 60% of the core polymer composition and up to 30% of the final core-shell polymer. Most preferably, the hydrophobic polymer comprises between 10% and 50% of the core polymer composition and between 5% and 25% of the final core-shell polymer. Core polymer composition refers to the hydrophobic polymer and monomers used to form the core. The hydrophobic polymer has a number average molecular weight greater than or equal to 1,000 and a weight average molecular weight of greater than or equal to 10,000, and may be any suitable polymeric compound. The hydrophobic polymer has an acid number of between 0 and 7 mg KOH/g.

For purposes of the present invention, suitable hydrophobic compounds include condensation polymers including polyester polymers, polyurethane polymers, alkyds, and polyether polymers. Also suitable are hydrophobic addition polymers and copolymers formed by free radical addition polymerization of α,β-ethylenically unsaturated monomers. The condensation and addition polymers can also include trialkyl silyl groups or fluorine groups. The hydrophobic compound can be any mixture of the above mentioned polymers.

Examples of suitable polyester polymers are those prepared from polyfunctional acids and polyhydric alcohols. Examples of such acids include phthalic acid, isophthalic acid, adipic acid, succinic acid, fumaric acid, maleic acid, azelaic acid, sebacic acid, and anhydrides thereof, dimethylolpropionic acid, and ricinoleic acid, and hydroxy acids such as 12-hydroxystearic acid. Suitable polyhydric alcohols are 1,4-butanediol, 1,6-hexanediol, neopentyl glycol, ethylene glycol, propylene glycol, diethylene glycol, dipropylene glycol, butylene glycol, glycerol, trimethylolpropane, pentaerythritol, sorbitol and 2,2,3,3,4,4-hexafluoro-1,5-pentanediol. Often additional acids such as phthalic acid, isophthalic acid, adipic acid, azeleic acid, acid and the anhydrides thereof may be added to provide desirable properties. Other acids and alcohols that may be included are the acids having between 12 and 36 carbon atoms in the alkyl portion of the molecule, particularly preferred are the dimer fatty acids. Suitable alcohols include alcohols derived from fatty alcohols. Particularly preferred are dimer fatty alcohols. Other components of polyesters can include lactones such as, ε-caprolactone and δ-butyrolactone.

A polyester containing polymerizable α,β- ethylenically unsaturated groups can be obtained by reacting polyol containing an α, β-ethylenically unsaturated group with polycarboxylic acid and/or anhydride. Examples of these include glyceryl monomethacrylate, allyloxy-1,2-propanediol and trimethylolpropane mono allyl ether.

The hydrophobic polyurethanes are formed by reacting a polyol with a polyisocyanate. The organic polyisocyanate can be an aliphatic polyisocyanate, including a cycloaliphatic polyisocyanate or an aromatic isocyanate. Useful polyisocyanates include ethylene diisocyanate, 1,2-diisocyanatopropane, 1,3-diisocyanatopropane, 1,4-butylene diisocyanate, lysine diisocyanate, 1,4-methylene bis (cyclohexyl isocyanate), isophorone diisocyanate, toluene diisocyanate, isocyanurates of toluene diisocyanate, diphenylmethane 4,4'-diisocyanate, isocyanurates of diphenylmethane 4,4'-diisocyanate, methylenebis-4, 4'-isocyanatocyclohexane, isophorone diisocyanate, isocyanurates of isophorone diisocyanate, 1,6-hexamethylene diisocyanate, isocyanurates of 1,6-hexamethylene diisocyanate, 1,4-cyclohexane diisocyanate, p-phenylene diisocyanate, triphenylmethane 4,4',4"-triisocyanate, tetramethyl xylene diisocyanate, and metaxylene diisocyanate.

The polyol used to prepare the polyurethane can be polymeric such as polyester polyols, polyether polyols, or polyurethane polyols, or it can be a simple diol or triol such as 1,6-hexane diol, ethylene glycol, propylene glycol, butylene glycol, neopentyl glycol, diethylene glycol, triethylene glycol, tetraethylene glycol, glycerol, glyceryl methacrylate, trimethylol ethane, trimethylolpropane or hexanetriol. The polyol may include fluorine groups or silane groups. Examples of these include 2,2,3,3,4,4-hexafluoro-1,5-pentanediol and perfluoroazelaic acid.

Polyols that may be included to provide α,β-ethylenic unsaturation in the polyurethane include allyloxy 1,2-propanediol, trimethylolpropane monoallyl ether and glyceryl monomethacrylate. Mixtures can also be utilized.

For purposes of the present invention, polyester polyols comprising the reaction products of aliphatic, cycloaliphatic, or aromatic dicarboxylic acids and/or anhydrides and aliphatic, cycloaliphatic, or aromatic diols as described in the preceding paragraph for hydrophobic polyesters can be reacted with polyisocyanate to form the hydrophobic polyurethane. The polyol can also be an addition polymer with terminal OH groups, such as the oligomer of styrene and allyl alcohol (available commercially as RJ 100 from Monsanto Co., St. Louis, Mo.).

Two general synthetic approaches are utilized to synthesize the polyurethane resin. A polyurethane having terminal hydroxy functionality is obtained by reacting polyisocyanate and polyol in an OH:NCO equivalent ratio of greater than 1:1. In this case, capping of the isocyanate occurs simultaneously with the synthesis of the polyurethane resin. Alternatively, polyurethane may be formed by reacting polyisocyanate and polyol in an OH:NCO ratio of less than 1:1. In this case, where excess isocyanate is used, the polyurethane having unreacted isocyanate functionality is then reacted with a capping agent prior to its use as a hydrophobe.

Capping agents for residual unreacted isocyanate on the polyurethane include non-reactive and reactive alcohols or amines. Preferably, the capping agent is a non-reactive alcohol, such as a mono-ol or amine. Examples of these include n-butanol, n-pentanol or n-hexanol. Alternatively, where reactive capping agents are used, examples of the reactive alcohols or amines include trimethylolpropane, ethanolamine, diethanolamine, Solketal, diols, triols, or a mixture of diols and triols.

Capping agents that may be used to provide α,β-ethylenic unsaturation can be obtained by reacting the polyol and polyisocyanate with an α,β-ethylenically unsaturated monomer with at least one H atom reactive towards an isocyanate group. Examples of these include hydroxyethyl acrylate, hydroxyethyl methacrylate, hydroxypropyl acrylate, hydroxypropyl methacrylate, hydroxybutyl acrylate, hydroxybutyl methacrylate, glyceryl monomethacrylate, allyloxy 1,2-propanediol, trimethylolpropane monoallyl ether.

A polyurethane containing polymerizable vinyl groups can be obtained by reacting the polyol and isocyanate with a vinyl monomer having at least one H atom reactive towards an isocyanate group. Examples of these include allyloxy 1,2-propanediol, trimethylolpropane monoallyl ether and glyceryl monomethacrylate. The polyol may include fluorine groups or silane groups.

As mentioned earlier, suitable hydrophobic compounds also include alkyd polymers. The alkyd polymers are polyesters of polyhydroxyl alcohols and polycarboxylic acids chemically combined with various drying, semi-drying and nondrying oils in different proportions. Thus, for example, the alkyd resins are made from polycarboxlylic acids such as phthalic acid, maleic acid, fumaric acid, isophthalic acid, succinic acid, adipic acid, azeleic acid, and sebacic acid as well as from, anhydrides of such acids, where they exist. The polyhydric alcohols which can be reacted with the polycarboxylic acid include 1,4-butanediol, 1,6-hexanediol, neopentyl glycol, ethylene glycol, diethylene glycol, 2,3-butylene glycol, glycerol, trimethylolpropane, pentaerythritol, sorbitol and mannitol.

The alkyd resins are produced by reacting the polycarboxylic acid and the polyhydric alcohol together with a drying, semi-drying or non-drying oil in proportions depending upon the properties desired. The oils are coupled into the resin molecule by esterification during the manufacturing and become an integral part of the polymer. The oil is fully saturated or predominately unsaturated. When formed into films, the fully saturated oils tend to give a plasticizing effect to the film, whereas the predominately unsaturated oils tend to crosslink and dry rapidly with oxidation to give more tough and solvent resistant films. Suitable oils include coconut oil, fish oil, linseed oil, tung oil, castor oil, cottonseed oil, safflower oil, soybean oil, and tall oil. Various proportions of the polycarboxylic acid, polyhydric alcohol and oil are used to obtain alkyd resins of various properties as is well know in the art.

Examples of polyether polyols are polyalkylene ether polyols which include poly(oxytetraethylene) glycols, poly(oxy-1,2-propylene) glycols and poly(oxy-1,2-butylene) glycols.

Also useful are polyether polyols formed from oxyalkylation of various polyols, for example, glycols such as ethylene glycol, 1,6-hexanediol, Bisphenol A and the like, or other higher polyols, such as trimethylolpropane, pentaerythritol and the like. Polyols of higher functionality which can be utilized as indicated can be made, for instance, by oxyalkylation of compounds such as sorbitol or sucrose. One commonly utilized oxyalkylation method is to react a polyol with an alkylene oxide, for example, ethylene or propylene oxide, in the presence of an acidic or basic catalyst.

As was mentioned above, the addition polymers which are examples of suitable substantially hydrophobic polymers include those obtained by either polymerization of α,β ethylenically unsaturated monomers or of olefinic polymerization. The polymers obtained by polymerization of α,β ethylenically unsaturated monomers include but are not limited to polymers and copolymers obtained from:

polymerizable amide compounds including acrylamide, N-(1,1-dimethyl-3-oxobutyl)-acrylamide, N-alkoxy amides such as methylolamides; N-alkoxy acrylamides such as n-butoxy acrylamide; N-aminoalkyl acrylamides or methacrylamides such as aminomethylacrylamide, 1-aminoethyl-2-acrylamide, 1-aminopropyl-2-acrylamide, 1-aminopropyl-2-methacrylamide, N-1-(N-butylamino)propyl-(3)-acrylamide, 1-aminohexyl-(6)-acrylamide, 1-(N,N-dimethylamino)-ethyl-(2)-methacrylamide, 1-(N,N,dimethylamino)-propyl-(3)-acrylamide and 1-(N, N-dimethylamino)-hexyl-(6)-methacrylamide;

polymerizable nitriles such as acrylonitrile and methacrylonitrile;

polyalkylene glycol acrylates and methacrylates such polyethylene glycol substituted acrylate and methacrylate;

alkyl acrylates or alkyl methacrylates such as methyl acrylate, methyl methacrylate, ethyl acrylate, ethyl methacrylate, n-butyl acrylate, n-butyl methacrylate, 2-ethylhexyl acrylate, cyclohexyl methacrylate, 2-ethylhexyl methacrylate, stearyl methacrylate, sulfoethyl methacrylate, isobornyl methacrylate, and lauryl methacrylate;

polymerizable aromatic compounds including styrene, α-methyl styrene, vinyl toluene, t-butyl styrene;

α-olefin compounds such as ethylene, propylene;

vinyl compounds such as vinyl acetate, vinyl propionate, vinyl ethers, vinyl and vinylidene halides, diene compounds such as butadiene and isoprene.

Other suitable hydrophobic monomers include those with fluorine or silicon atoms. Examples of these include 1H, 1H, 5H-octafluoropentyl acrylate, and trimethylsiloxyethyl acrylate.

Other suitable hydrophobic polymers include polyalkylene homopolymers, polyalkylene copolymers or polyalkylene block copolymers. Such compounds are polymerized from olefins selected from the group consisting of ethylene, propylene, butylene, and mixtures thereof. An example is a (ethylene/butylene) polymer having terminal hydroxy functionality, available commercially from Shell Chemical Company, Houston Texas, and sold under the trademark Kraton®.

The hydrophobic polymeric compound used in the core may contain reactive functionality to react with functional groups on the core and/or shell monomers during polymerization. Alternatively, a reactive functionality on the hydrophobe may react with the core polymer and/or shell polymer (s) after polymerization. Such functionalities include residual ethylenic unsaturation or reactive groups, such as hydroxyl, amino, carbamate, carbonate, epoxy, carbodiimide or urea groups, and any other suitable functional group not enumerated above.

In the preferred embodiment the hydrophobe does not contain residual reactive functionality that would react with a crosslinking agent.

The hydrophobic polymer may comprise greater than 60% by weight of the total core composition, but preferably comprises up to 60% of the total core composition. The α, β-ethylenically unsaturated monomers comprise the remainder of the core composition, preferably comprising between 40.0 and 99.0% by weight of the total weight of the core composition. Preferably the hydrophobic polymer is present in an amount between 1.0 and 30.0% by weight, based on the total weight of the emulsion polymer, and most preferably between 5.0 and 25.0% by weight, based on total weight of the emulsion polymer.

Suitable monomers used in the first stage, to polymerize the core polymer formed in the first stage are α,β-ethylenically unsaturated monomers including the monomers described earlier for the synthesis of the hydrophobic addition polymer.

Monomers having reactive functional groups may also be included in the cores Examples of these include but are not limited to:

hydroxyl-containing monomers such as 2-hydroxyethyl acrylate, 2-hydroxyethyl methacrylate, hydroxypropyl methacrylate, hydroxybutyl acrylate, hydroxybutyl methacrylate, allyl alcohol, and methallyl alcohol; epoxy functional monomers such as glycidyl methacrylate; nitrogen containing alkyl acrylates or methacrylates such as aminomethyl, aminoethyl, aminopropyl, aminobutyl and aminohexyl acrylates and methacrylates, dimethylaminoethyl acrylate, dimethylaminoethyl methacrylate; N-alkoxymethylacrylamide monomers including N-methoxymethyl)acrylamide, N-(propoxymethyl)acrylamide, N-isopropoxymethyl-acrylamide, N-(butoxymethyl)acrylamide;, isocyanate functional monomers such as dimethyl-meta-isopropenylbenzyl isocyanate; sulfonic acid functional monomers such as 2-acrylamido-2-methylpropane sulfonic acid, alkoxy alkyl acrylates and methacrylates, carbonate functional monomers such as the carbonate of glycidyl methacrylate, and carbamate functional monomers such as 2-carbamate ethyl methacrylate and 2-carbamate propyl methacrylate.

Optionally, the core or shell, or both can be crosslinked. This crosslinking can be achieved by including crosslinking monomers such as 1,6-hexane diacrylate, divinyl benzene, allyl methacrylate, ethylene glycol dimethacrylate, trimethylolpropane triacrylate.

The mixture of hydrophobic polymer and monomers may also contain surfactant in an amount between 1.0 and 5.0 percent by weight, based on the total solids weight of the core. The surfactant used in the high stress technique serves to achieve the requisite dispersion stability of the particles formed by the technique. The surfactant serves to prevent the emulsified particles from agglomerating to form larger particles.

The same surfactants or dispersants which can be utilized during conventional emulsion polymerizaton are also suitable for this high stress technique. Examples of suitable surfactants include the dimethylethanolamine salt of dodecyl benzenesulfonic acid, sodium dioctylsulfosuccinate, ethoxylated nonylphenol and sodium dodecyl benzene sulfonate. The surfactant can be anionic, cationic, nonionic, amphoteric, or a mixture of these. Other materials well known to those skilled in the art are also suitable.

Optionally, hydrophobic solvents such as cetyl alcohol and hexadecane may also be used in the pre-emulsion mixture.

Stress is applied to the core mixture of surfactant, hydrophobic polymer, hydrophobic monomers and water, by high stress techniques. High stress techniques refer to techniques suitable to obtain droplet or particle sizes of between 50 and 500 nm, preferably between 100 nm and 300 nm. In a preferred embodiment the high stress technique is a MICROFLUIDIZER® emulsifier, which is available from Microfluidics Corporation in Newton, Mass. The MICROFLUIDIZER® high pressure impingement emulsifier is patented in U.S. Pat. No. 4,533,254. The device consists of a high pressure (up to 25,000 psi) pump and an interaction chamber where the emulsification takes place. Generally, the reaction mixture is passed through the emulsifier once at a pressure between 5,000 and 15,000 psi. Multiple passes can result in smaller average particle size and a narrower range for the particle size distribution.

Stress is described as force per unit area. Although the precise mechanism by which the MICROFLUIDIZER® emulsifier stresses the pre-emulsification mixture to particulate it is not thoroughly understood, it is theorized that stress is exerted in more than one manner. It is believed that one manner in which stress is exerted is by shear. Shear means that the force is such that one layer or plane moves parallel to an adjacent, parallel plans. Stress can also exerted from all sides as a bulk, compression stress. In this instance stress could be exerted without any shear. A further manner of producing intense stress is by cavitation. Cavitation occurs when the pressure within a liquid is reduced enough to cause vaporization. The formation and collapse of the vapor bubbles occurs violently over a short time period and produces intense stress. Although not intending to be bound by theory, it believed that both shear and cavitation contribute to producing the stress which particulates the pre-emulsification mixture.

Alternative modes of applying stress to the pre-emulsification mixture can be utilized so long as sufficient stress is applied to achieve the requisite particle size distribution. For example, one alternative manner of applying stress would be by the use of ultrasonic energy. For purposes of the present invention, the droplet or particle size is preferably between 100 nm and 300 nm. After polymerization, less than 20 percent of the polymer droplets have a mean diameter greater than 200 nm.

The polymerizable material in the microparticle mixture formed by the high stress technique, is polymerized by either a batch redox or thermal semi-continuous emulsion polymerization process. Where the polymer is intended for use in coating compositions, polymerization is preferably by semi-continuous emulsion polymerization. Suitable initiators for the reaction include water soluble initiators and water insoluble initiators. Examples of water soluble initiators include ammonium peroxydisulfate, potassium peroxydisulfate, sodium metabisulfite and hydrogen peroxide. Water insoluble initiators include t-butyl hydroperoxide, dilauryl peroxide, t-butyl perbenzoate and 2,2'-azobis (isobutyronitrile). Preferably redox initiators include ammonium peroxydisulfate and sodium metabisulfite with ferrous ammonium sulfate.

Suitable hydrophilic monomers include those set forth above in the description of monomers used to synthesize the hydrophobic addition polymer and core polymer. The hydrophilic monomers must include at least one hydrophilic α,β-ethylenically unsaturated monomer.

Hydrophilic monomers include those include those having a functionality selected from the group consisting of sulfonic acid groups, such as 2-acrylamido-2-methylpropane sulfonic acid; monomers having carboxyl groups such as acrylic acid, methacrylic acid, crotonic acid, itaconic acid, maleic acid, fumaric acid, 2-acryloxymethoxy-O-phthalic acid, 2-acryloxy-1-methylethoxy-O-hexahydrophthalic acid; monomers having acrylamide groups such as methylolamides, n-butoxy acrylamide; n-alkoxymethylacrylamides, N-aminoalkyl acrylamides, or methacrylamides, and mixtures thereof. The hydrophilic monomers include, polyalkylene glycol acrylates and methacrylates, alkoxy alkyl acrylates and methacrylates, polyether acrylates and mixtures thereof.

Monomers with co-reactive functionalities can be included in the core, the shell, or both. For example, the core may include a reactive functional group and the shell may include a functional group that is reactive toward the core functional group. There are many pairs of functional groups that can be employed for this purpose. For example, when one functionality is an isocyanate group, the other can be a group with an active hydrogen, such as an hydroxyl group or a primary or secondary amino group. Alternatively, when one group is an acid or anhydride, the other can be an epoxy or hydroxyl group. When one group is an epoxy group, the other can be a hydroxy, phenol, or a primary or secondary amino group. When one group is an n-alkoxy methacrylamide, the other can be a hydroxyl group. When one group is primary or secondary carbamate, the other can be an alkoxy methyl amino group or n-alkoxy methyl acrylamide. Where one functional group is carbodiimide, the other can be an acid functionality. Where a functional group is a linear or cyclic carbonate, the other can be a primary or secondary amine.

The practitioner will readily recognize that many combinations of groups for will serve the purpose of reacting together the first and second acrylics to form the grafted acrylic polymer. While reaction conditions might vary, such conditions would be readily apparent to the skilled artisan from experience or straightforward testing. It may be useful to employ catalysts such as are known in the art, as for example to use tin catalyst in reacting isocyanate groups with alcohol groups or to use triphenyl phosphine or amines to catalyze reaction of epoxy groups with carboxylic acid groups.

The ratio of the core and shell may be varied depending on the polymer characteristics desired. The core composition, including hydrophobic polymer and core monomers, can comprise between 25% and 75% of the total weight of the core-shell polymer. The shell monomers comprise the remainder of the core-shell polymer. The ratio of the core composition weight to the shell weight ranges from 25:75 to 75:25, respectively.

The type of emulsion polymerization is dependent on the future use for the emulsion polymer. When the emulsion polymer is to be used for coating compositions, a semi-continuous thermal emulsion polymerization process is preferred, as the batch redox process results in the production of salts which are undesirable in coating compositions.

The resulting hydrophobically modified acrylic emulsions are suitable for waterborne coating compositions. Such coating compositions include, in addition to the modified acrylic emulsion, rheology control agents, pigments, crosslinking agents, plasticizers, solvents, and mixtures thereof.

The coatings may be used without pigment to form a clearcoat, or may be combined with pigment to form a basecoat for use over polymeric or metallic substrates. The basecoat or clearcoat may be used in automotive color plus clear applications. The coating compositions may be applied at high solids content of greater than 25% which means that one can apply more paint with less emissions and fewer passes of the spray gun. Generally, the solids content is 25–30%. The compositions containing the emulsion polymer of the present invention have good leveling and flow characteristics and exhibit an excellent automotive quality finish. The compositions also have excellent cure response and low volatile organic content. Typically, the volatile organic content is less than 3.5%.

It should be understood that the claimed coating compositions are also suitable for other applications different from automotive color plus clear. The claimed coatings are suitable as one coat compositions for use either over primed or unprimed substrates.

The coating composition of the present invention can be applied by conventional means such as air or airless spray application. The compositions are particularly advantageous in that, if desired, one can apply the coatings wet-on-wet without an intermediate baking step between coats.

The present invention is also directed to a method of preparing a multilayer, coated substrate. The method comprises applying to the substrate a waterborne coating composition comprising the emulsion polymer detailed above. This is followed by the application to said basecoat of a clear coating composition. The clearcoat can contain the emulsion polymer of the present invention or may be a different clearcoat. The coating compositions that are suitable for use as the clear coating compositions include a wide variety of conventional automotive clear coating compositions well known to those skilled in the art, including powder clear coating compositions and solvent borne clear coating compositions. The multicoated substrate is then cured. As was mentioned above, the waterborne basecoating composition of the present invention can be applied with other coating compositions to a substrate wet-on-wet without an intermediate baking step, although, if it is desired, an intermediate baking step can be included. The coating compositions of the present invention can be cured by baking at a baking temperature of from about 80° C. to about 132° C. It should be understood that for the purposes of the present invention the term "curing" also includes drying, in the event crosslinking agents are not included in a coating composition (e.g., a lacquer coating).

The following non-limiting examples are set forth to illustrate the present invention.

EXAMPLES

Example 1

Preparation of Hydrophobic Polyester

| Ingredient | Amount (% by Weight) |
|---|---|
| Dimer Fatty Acid[1] | 45.12 |
| Isopropyl Alcohol | 12.95 |
| 1,6-hexanediol | 24.07 |
| Toluene | 1.83 |
| Methyl propyl ketone | 16.03 |
| Total | 100.00 |

[1] Sold under the trademark, Pripol ® 1009, from Unichema International, Chicago, Illinois.

The dimer fatty acid and 1,6-hexane diol were added to a reactor under nitrogen blanket. Isopropyl alcohol was added and the mixture was heated to a temperature of about 200° F., with continuous mixing. Toluene was used to flush the pump and/or loading line. The column overhead was set to 200° F. Heating was continued until a temperature of 280° F. was reached. Five hours after the 280° F. temperature was reached, the column overhead temperature was reset to 215° F. and left at this setting for the rest of the process. Toluene was allowed to return to the reactor until the temperature was 310° F. At 310° F., return of the toluene was stopped. The batch was heated until 420° F. was reached Sampling was then begun to determine the acid number. The reaction was allowed to continue until an acid number of between 3.50–4.20 was reached. The resin was then cooled and solids were adjusted with the addition of methyl propyl ketone.

Example 2

Preparation of Polyurethane Resin

| Ingredient | Amount (Wt. %) |
|---|---|
| Polyester resin from Ex. 1 | 39.62 |
| Neopentyl glycol | 4.16 |
| Allyloxy 1,2-propanediol | 1.66 |
| Methyl propyl ketone | 9.00 |
| N-methyl-2-pyrrolidone | 10.23 |
| Tetramethyl-1,3,-xylene diisocyanate | 26.60 |
| Dibutyl tin dilaurate | 0.07 |
| Methyl propyl ketone | 1.10 |
| Trimethylolpropane | 7.56 |
| Total | 100.00 |

The polyester resin, neopentyl glycol, allyloxy 1,2-propanediol, methyl propyl ketone, N-methyl-2-pyrrolidone and tetramethyl-1,3,-xylene diisocyanate were charged to a reactor and heated to reflux under nitrogen blanket. After 2 hours, dibutyl tin dilaurate was added to the reactor. The reaction was then continued at 90° C., until the isocyanate number dropped to 0.75. The remaining isocyanate was reacted with trimethylol propane and the reaction was continued until the isocyanate number dropped to zero. The reaction was then cooled.

The resultant polyurethane polymer had a non-volatile content of 80%, and a weight average molecular weight of 12,000.

Example 3

Preparation of Polyurethane Resin for Use in Core

| Ingredient | Amount (Wt. %) |
|---|---|
| Polyester resin from Ex. 1 | 39.41 |
| Neopentyl glycol | 4.11 |
| Allyloxy-1,2-propanediol | 1.64 |
| Methyl propyl ketone | 9.23 |
| N-methyl-2-pyrrolidinone | 10.12 |
| Tetramethyl xylene diisocyanate | 26.32 |
| Dibutyl tin dilaurate | 0.07 |
| n-butanol | 9.10 |
| Total | 100.00 |

Example 4

Preparation of Hydrophobically Modified Acrylic Emulsion Polymers

Procedure:

All ingredients were included in the amounts shown in Table 1, below. Deionized water was heated in a 5 liter kettle to 82° C. The hydrophobe and core monomers were mixed with deionized water and surfactant until homogenous. This mixture was passed through a microfluidizer at 8000 psi to form particles, resulting in the production of a pre-emulsion polyurethane-monomer mixture.

An initiator solution of ammonium persulfate and deionized water was prepared and added together with the monomer-polyurethane mixture over a period of 1 hour at a temperature of between 80° and 85° C., to form the core polymer.

A second monomer mixture of shell monomers was formed by combining the shell monomers and surfactant, with mixing. This mixture was added to the core polymer over a period of 2 hours at temperatures between 80°–82° C. After the addition of the shell monomers the reaction was held for two hours. Then the emulsion was cooled and filtered.

TABLE 1

Composition of Various Samples of Hydrophobically Modified Acrylic Emulsion Polymers
(All amounts are set forth in grams)

| | Sample | | | | |
|---|---|---|---|---|---|
| Ingredient | 1 | 2 | 3 | 4 | 5 |
| Deionized Water | 24.0 | 24.0 | 21.16 | 21.99 | 10.94 |
| Deionized Water | 3.0 | 3.0 | 3.0 | 3.0 | 3.0 |
| Initiator | 0.054 | 0.054 | 0.054 | 0.054 | 0.054 |
| HYDROPHOBE | | | | | |
| Polyurethane Acid No. = 0[1] | 11.04 | — | 11.25 | 11.11 | 11.11 |
| HPVM 1201[2] | — | 9.0 | — | — | — |
| CORE MONOMERS | | | | | |
| Methyl Methacrylate | 5.40 | 5.40 | 4.27 | 0.90 | 9.9 |
| Ethylene glycol dimethacrylate | — | — | 1.127 | — | — |
| Butyl Acrylate | 4.05 | 4.05 | — | 0.68 | 7.42 |
| Hydroxy Ethyl Methacrylate | 1.35 | 1.35 | 1.35 | 0.23 | 2.47 |
| Butyl Methacrylate | 2.70 | 2.70 | 2.70 | 0.45 | 4.95 |
| Deionized Water | 22.86 | 24.9 | 25.17 | 22.86 | 35.81 |
| Anionic Surfactant (Abex)[3] | 3.0 | 3.0 | 3.0 | 3.0 | 4.5 |
| SHELL MONOMERS | | | | | |
| Methyl Methacrylate | 9.0 | 9.0 | 7.42 | 15.01 | 4.5 |
| Butyl Acrylate | 6.75 | 6.75 | 6.75 | 10.58 | 3.375 |
| Hydroxy Ethyl Methacrylate | 2.25 | 2.25 | 2.25 | 3.53 | 1.125 |
| Butyl Methacrylate | 3.71 | 3.71 | 3.71 | 5.82 | 1.86 |
| Methacrylic Acid | 0.79 | 0.79 | 2.37 | 0.79 | 0.79 |
| Nonionic Surfactant[4] | 0.10 | 0.10 | 0.2 | — | — |
| % Non-volatile | 45.9 | 46.03 | 47.65 | — | 45.96 |

[1]As prepared in Example 3.
[2]Polyethylene/butylene polymer available under the trademark Kraton ® from Shell Chemical Company, Houston, Texas.
[3]Abex EP-110 anionic surfactant from Rhone Poulenc, Cranberry, New Jersey 08512.
[4]Igepal CO-850 nonionic surfactant from GAF Corporation Chemical Products, New York, N.Y.

Example 5

Coating Composition with Modified Acrylic Emulsion

An aluminum slurry was prepared by mixing the following ingredients:

| | |
|---|---|
| Propylene Glycol n-Butyl Ether | 61.9 grams |
| Propylene Glycol n-Propyl Ether | 12.0 grams |
| Eckart VP46432/G Aluminum | 78.4 grams |
| Polymeric Dispersant[1] | 28.4 grams |
| Cymel 301[2] | 50.9 grams |
| Polypropylene oxide 410[3] | 25.4 grams |

[1]Graft copolymer prepared by BASF Corporation.
[2]Melamine formaldehyde resin commercially available from Cytec, Danbury CT.
[3]Pluracol P410 commercially available from BASF Corporation, Wyandotte, MI.

425 grams of the emulsion polymer described in Ex. 3, sample 1, was added to a mixing vessel, followed by the addition of 16.9 grams of Viscalex HV-30 (Allied Colloids Inc.) and 287 grams of deionized water. This mixture was neutralized to pH=8.0 with 15.4 grams of a 20% solution of 2-amino 2-methyl-1-propanol. To this mixture the above described aluminum slurry was added, and then pH adjusted with 3.0 grams of 20% solution 2-amino-2-methyl-1-propanol. Final viscosity adjusted with 109 grams of deionized water. The final coating composition had a solids content of 27–29% non-volatile and a viscosity 100–130 cps @ 400 l/s shear rate.

I claim:

1. A process for emulsion polymerization of hydrophobically modified emulsion polymers comprising the steps of
   a) forming a mixture of hydrophobic polymer, α,β-ethylenically unsaturated monomers, surfactant and water, wherein the hydrophobic polymer is present in an amount of up to 60% by weight, based on the total weight of hydrophobic polymer and monomers used in the mixture,
   b) subjecting the mixture formed in a) to high stress techniques to form surfactant stabilized particles of the hydrophobic polymer and monomers, in the aqueous phase,
   c) co-polymerizing the α,β-ethylenically unsaturated groups within the particles to form a hydrophobically modified core polymer,
   d) adding to the polymer formed in step c) α,β-ethylenically unsaturated monomers including at least one hydrophilic α,β-ethylenically unsaturated monomer, and co-polymerizing the monomers to form a hydrophilic shell polymer, wherein the resultant polymer is a hydrophobically modified core-shell emulsion polymer.

2. A process as defined in claim 1, wherein the hydrophobic polymer used in step a) is selected from the group consisting of hydrophobic condensation polymers and copolymers, and hydrophobic addition polymers and copolymers.

3. A process as defined in claim 1, wherein the hydrophobic polymer used in step a) is a condensation polymer selected from the group consisting of polyesters, polyurethanes, alkyds, polyethers and mixtures thereof.

4. A process as defined in claim 1, wherein the hydrophobic polymer used in step a) is an addition polymer selected from the group consisting of polymers and copolymers of ethylene, propylene, butylene and mixtures thereof.

5. A process as defined in claim 1, wherein the hydrophobic polymer is present in an amount up to 30% by weight based on the total core-shell emulsion polymer weight.

6. A process as defined in claim 1, wherein the hydrophobic polymer is present in an amount between 5 and 25% by weight, based on total core-shell emulsion polymer weight.

7. A process as defined in claim 1, wherein the hydrophobic polymer introduced into the emulsion particles has an acid number of between 0 and 7 mg KOH/g.

8. A process as defined in claim 1, wherein the core comprises α,β-ethylenically unsaturated monomers present in an amount between 99.0 and 50.0% by weight and hydrophobic polymer present in an amount between 1.0 and 50% by weight, based on the weight of the core.

9. A process as defined in claim 1, wherein the hydrophilic monomers used to form the shell include α,β-ethylenically unsaturated monomers having a functionality selected from the group consisting of carboxy, isocyanate, substituted acrylamide, carbonate, hydroxy, phenoxy, amino, urea, substituted amino, polyether, alkoxy alkyl, and polyalkylene glycol groups, sulfonates, and mixtures thereof.

10. A process as defined in claim 1, wherein the core and/or shell include(s) monomers selected from the group consisting of 1,6-hexane diacrylate, divinyl benzene, allyl methacrylate, ethylene glycol dimethacrylate, trimethylolpropane triacrylate and mixtures thereof.

11. A process as defined in claim 1, wherein the core polymer is reacted with a monoalcohol prior to polymerization of the shell polymer.

12. A process as defined in claim 1, wherein the core and shell are present in a ratio of between 25:75 and 75:25, respectively.

13. A process as defined in claim 1, wherein step c) is accomplished by a batch redox polymerization process or a semi-continuous thermal emulsion polymerization process.

14. A process as defined in either claim 1 or claim 13, wherein step d) is accomplished by a batch redox emulsion polymerization process or semi-continuous thermal emulsion polymerization process.

15. A hydrophobically modified emulsion polymer prepared according to the process of claim 1.

16. A waterborne coating composition comprising
   a) hydrophobically modified emulsion polymer prepared according the process of claim 1, and
   b) at least one compound selected from the group consisting of consisting of plasticizers, crosslinking agents, pigments, solvents and mixtures thereof.

17. The coating composition according to claim 16 wherein the composition includes a crosslinking agent.

18. The coating composition according to claim 17 wherein the shell polymer includes reactive functional groups for reacting with the crosslinking agent.

19. The coating composition according to claim 17 wherein the hydrophobic polymer used in the core includes reactive functional groups for reacting with the crosslinking agent.

20. The coating composition according to claim 17 wherein the hydrophobic polymer used in the core is free from functional groups that react with the crosslinking agent.

21. A coating composition of claim 16, wherein the hydrophobic polymer used to form the emulsion polymer is selected from the group consisting of hydrophobic condensation polymers and copolymers, hydrophobic addition polymers and mixtures thereof.

22. A coating composition as defined in claim 16, wherein the hydrophobic polymer used to form the emulsion polymer is a condensation polymer selected from the group consisting of polyesters, polyurethanes, alkyds, polyethers and mixtures thereof.

23. A coating composition as defined in claim 16, wherein the hydrophobic polymer used to form the emulsion polymer is an addition polymer selected from the group consisting of polymers and copolymers of ethylene, propylene, butylene and mixtures thereof.

24. A coating composition as defined in claim 16, wherein the emulsion polymer comprises the hydrophobic polymer in an amount between 5 and 25% by weight, based on the total emulsion polymer weight.

25. A coating composition comprising a core-shell emulsion polymer according to claim 16, wherein the hydrophobic polymer used in the core is a polyurethane and any residual isocyanate functionality on the polyurethane is reacted with a monoalcohol prior to formation of the core polymer.

26. A coating composition as defined in claim 16, wherein the hydrophobic polymer used to form the emulsion has an acid number of between 0 and 7 mg KOH/g.

27. A coating composition containing a hydrophobic emulsion polymer prepared according the process of claim 1. wherein the mixture used to form the core includes α,β-ethylenically unsaturated monomers present in an amount between 99.0% and 50.0% by weight and hydrophobic polymer present in an amount between 1.0% and 50.0% by weight, based on the total weight of the core.

28. A coating composition containing hydrophobically modified emulsion polymers prepared according to the process of claim 1, wherein the hydrophilic monomers used to form the shell include α,β-ethylenically unsaturated monomers having a functionality selected from the group consisting of carboxy, isocyanate, substituted acrylamide, carbonate, hydroxy, phenoxy, amino, urea, substituted amino, polyether, alkoxy alkyl, and polyalkylene glycol groups, sulfonates, and mixtures thereof.

29. A coating composition containing hydrophobically modified emulsion polymers prepared according to claim 1, wherein the core includes monomers selected from the group consisting of 1,6-hexane diacrylate, divinyl benzene, allyl methacrylate, ethylene glycol dimethacrylate, trimethylolpropane triacrylate and mixtures thereof.

30. A coating composition containing hydrophobic emulsion polymers according to claim 1, wherein the shell includes monomers selected from the group consisting of 1,6-hexane diacrylate, divinyl benzene, allyl methacrylate, ethylene glycol dimethacrylate, trimethylolpropane triacrylate and mixtures thereof.

31. A waterborne coating composition comprising
    a) hydrophobically modified emulsion polymer prepared according the process of claim 1,
    b) a crosslinking agent, and
    c) at least one compound selected from the group consisting of consisting of plasticizers, pigments, solvents and mixtures thereof, wherein the shell polymer has reactive functional groups that react with the crosslinking agent.

32. The coating composition of claim 31 wherein the hydrophobic polymer used in the core is free from functional groups that react with the crosslinking agent.

33. The coating composition of claim 31 wherein the hydrophobic polymer used in the core has functional groups that react with the crosslinking agent.

34. A method for forming a coated article, comprising applying to a substrate a coating composition as defined in claim 18.

\* \* \* \* \*